US005890689A

United States Patent [19]
Johnson

[11] Patent Number: 5,890,689

[45] Date of Patent: Apr. 6, 1999

[54] AUTOMOBILE GARMENT HANGER

[76] Inventor: Jason G. Johnson, 100 Scholz Plz., PH 4, Newport Beach, Calif. 92117

[21] Appl. No.: 846,650

[22] Filed: May 1, 1997

[51] Int. Cl.[6] .......... A47F 5/00

[52] U.S. Cl. .......... 248/208; 248/215; 248/205.6; 248/339; 224/482; 224/559; 224/560; 224/561

[58] Field of Search .......... 248/334, 215, 248/208, 217, 231.81, 229.16, 229.26, 205.6; 224/482, 561, 559, 560, 540; 223/85, DIG. 2; 211/70.5

[56] References Cited

U.S. PATENT DOCUMENTS

| | | | |
|---|---|---|---|
| 1,290,299 | 1/1919 | Normandy . | |
| 1,361,056 | 12/1920 | Hickman | 248/215 |
| 1,726,316 | 8/1929 | Saxton | 248/215 |
| 2,150,826 | 3/1939 | Gill | 248/215 |
| 2,157,001 | 5/1939 | Morley | 248/205.6 |
| 2,344,339 | 3/1944 | Zwald | 224/482 |
| 2,706,049 | 4/1955 | Andrews | 224/482 |
| 2,717,110 | 9/1955 | Funk . | |
| 3,692,218 | 9/1972 | Friedman . | |
| 3,708,093 | 1/1973 | Toms, II | 224/560 |
| 3,887,079 | 6/1975 | Crew . | |
| 4,077,554 | 3/1978 | Goode | 224/559 |
| 4,231,501 | 11/1980 | Goode | 224/546 |
| 4,261,121 | 4/1981 | Coon . | |
| 4,327,837 | 5/1982 | Ross . | |
| 4,778,089 | 10/1988 | White et al. | 224/561 |
| 4,863,081 | 9/1989 | Gabbert . | |
| 4,932,626 | 6/1990 | Guillot . | |
| 5,044,534 | 9/1991 | Hwang . | |
| 5,104,083 | 4/1992 | Shannon | 248/339 |
| 5,328,068 | 7/1994 | Shannon . | |
| 5,524,948 | 6/1996 | Bostwick . | |
| 5,562,237 | 10/1996 | Saliaris . | |

*Primary Examiner*—Ramon O. Ramirez
*Assistant Examiner*—Long Dinh Phan
*Attorney, Agent, or Firm*—Randall C. Brown; Akin, Gump, Strauss, Hauer & Feld, L.L.P.

[57] ABSTRACT

A garment hanger suitable for hanging garments in an automobile. The hanger has a generally triangular open loop body and is adapted to be mounted on a window or an exit handle of an automobile. The garment hanger preferably has a plurality of dividers for supporting one or more garment hangers between adjacent dividers.

8 Claims, 2 Drawing Sheets

10
26
12
20
10
16
18
24
30
30
22
30
30
14

10
26

20
12
10
16
18
24
30
30
22
14
30
30

28
10

20
12
16
18
26
10
24
30
30
30
30
30
22
14
32
34
32
32
32

AUTOMOBILE GARMENT HANGER

BACKGROUND OF THE INVENTION

1. Field of the Invention

This present invention relates to a hanger designed to hang garments in automobiles. More specifically, the hanger has a triangular shape and an opening at one corner thereof that allows the hanger to be mounted onto a window or exit handle of an automobile.

2. Description of Related Information

It is desirable when traveling in an automobile to hang in a vertical orientation garments such as suit coats, overcoats, shirts, blouses, skirts and pants to prevent them from becoming wrinkled or crumpled.

Many automobiles include a hook attached to the ceiling of the automobile and at the rear door or doors from which a hanger may be hung. Other automobiles do not include such a hook but include an exit handle which may be used by a passenger riding in the back seat to assist themselves when exiting the automobile. Sometimes the exit handle will incorporate a small hook for supporting a hanger. In either case the conventional hooks and handles are difficult to use and usually accommodate only one hanger.

There is a need in the art for an automobile garment hanger that is easy to use and can be installed on the exit handle or window of an automobile which will greatly increase the number of garments which can be hung therefrom and which will facilitate the hanging process.

SUMMARY OF THE INVENTION

The automobile garment hanger of the present invention overcomes the above-mentioned disadvantages and drawbacks which are characteristic of the prior art.

In accordance with the present invention, an automobile garment hanger is disclosed which comprises a generally triangular body that is adapted to be mounted on an automobile window or exit handle.

The automobile garment hanger of the present invention preferably has a base leg and first and second side legs. The base leg preferably is integral with the first side leg and has a projection that is in overlapping engagement with the second side leg. The second side leg can be separated from the base leg projection to slip the automobile garment hanger of the present invention over the window or exit handle of an automobile. Preferably, the first side leg is joined to the second side leg at a junction therebetween.

According to a preferred embodiment of the automobile garment hanger of the present invention, a plurality of spaced dividers extend in a direction generally toward the junction of the first and second side legs of the generally triangular body. The dividers enable a plurality of garment hangers to be simultaneously supported from the automobile garment hanger in a neat and orderly fashion. When hung from a window or an exit handle of an automobile, the dividers extend in a substantially vertical direction. Consequently, when hangers are disposed between adjacent dividers and suspended from the automobile garment hanger of the present invention, the hangers and thus the garments disposed on the hangers hang in a vertical manner.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings.

DESCRIPTION OF THE PREFERRED EMBODIMENTS

Figure 3:
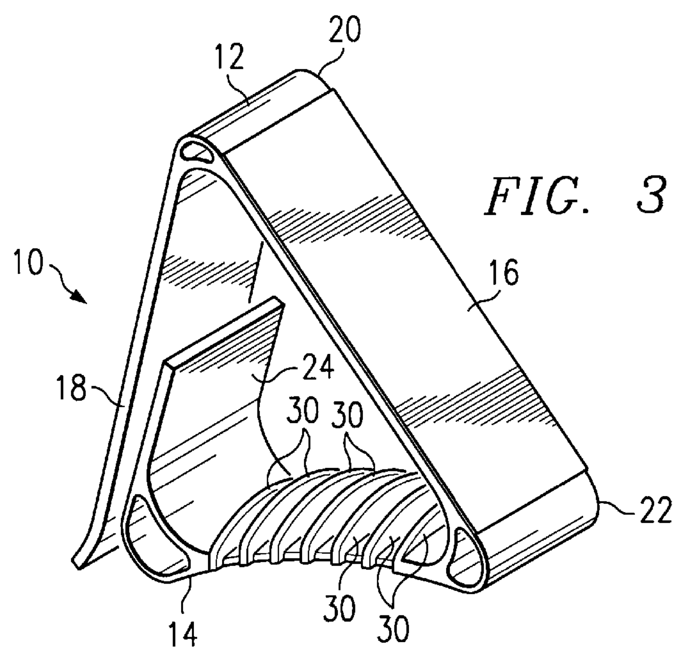
FIG. 3 shows a perspective view of the automobile garment hanger of the present invention.

Referring now to the drawings, and in particular to FIG. 3, a preferred embodiment of the automobile garment hanger of the present invention is shown and generally designated by the reference numeral 10. The automobile garment hanger 10 of the present invention is broadly comprised of a generally triangular body 12 which includes a base leg 14, a first side leg 16 and a second side leg 18.

Figure 1:
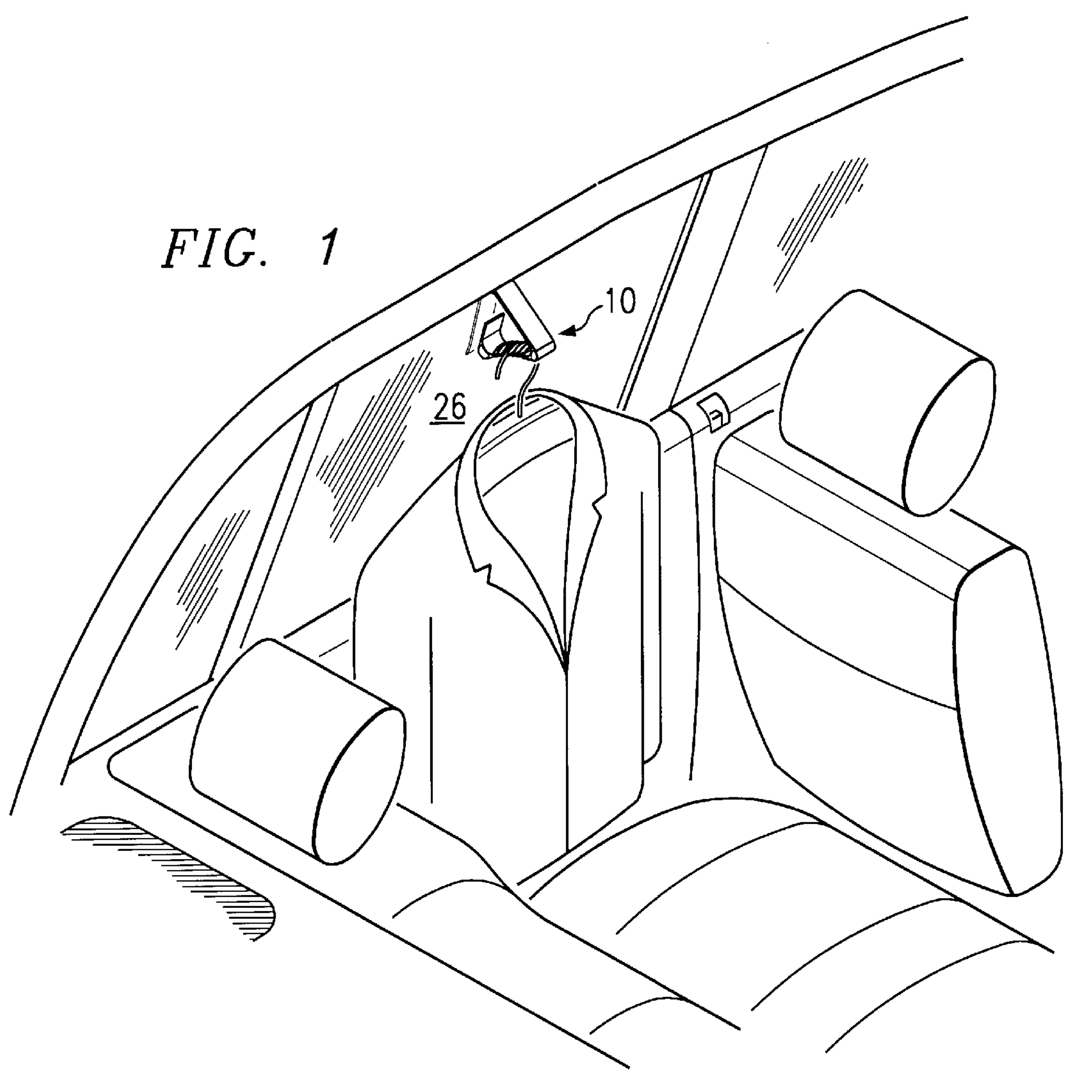
FIG. 1 shows a perspective view of the automobile garment hanger of the present invention supported from a window of an automobile.
Figure 2:
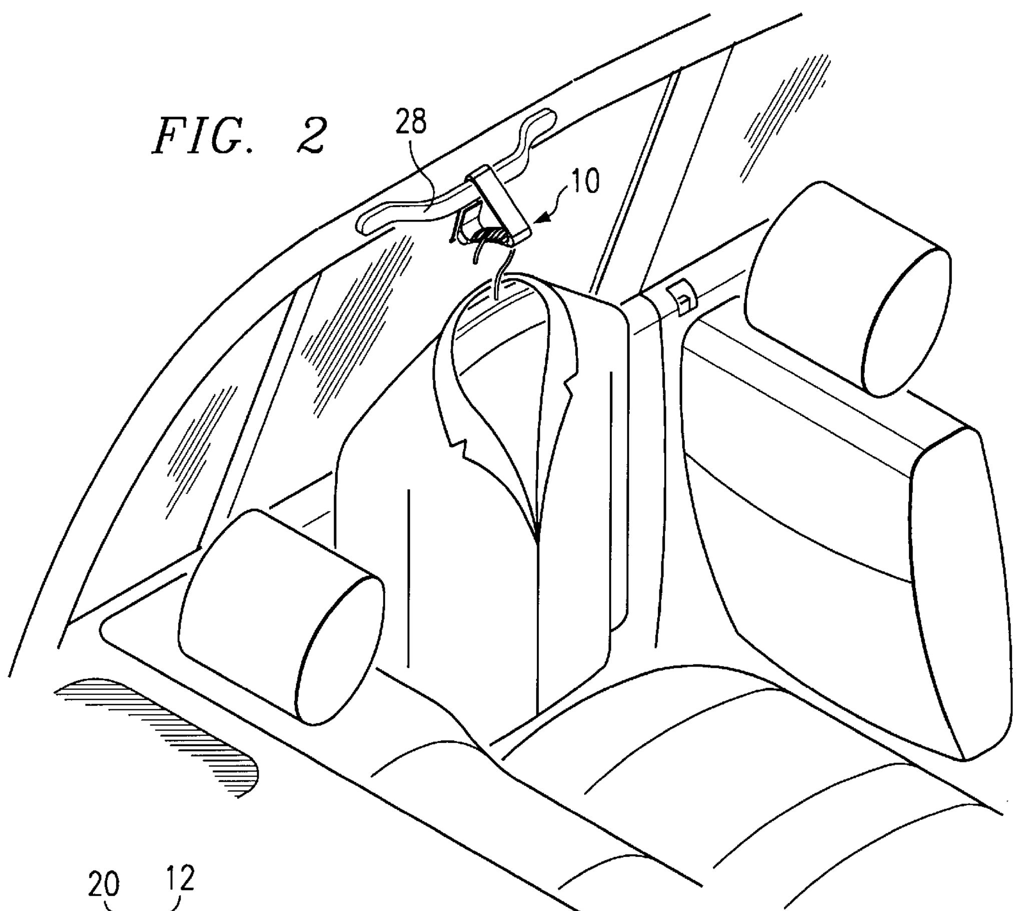
FIG. 2 shows a perspective view of the automobile garment hanger of the present invention supported from an exit handle of an automobile.

The first side leg 16 and the second side leg 18 are joined at juncture 20. The first side leg 16 and the base leg 14 are joined at juncture 22. The base leg 14 includes a projection 24 that abuts but is not joined to the second side leg 18. The automobile garment hanger 10 of the present invention comprises aluminum, plastic, composite material, textiles and Velcro® brand hook and loop fasteners so that the generally triangular body 12 is flexible. In this manner, the second side leg 18 may be separated from the projection 24 of the base leg 14 to permit the automobile garment hanger of the present invention 10 to be slipped over and supported from an automobile window 26 as shown in FIGS. 1 and 4 or an automobile exit handle 28 as shown in FIG. 2.

Returning to FIG. 3, the base leg 14 includes a plurality of generally vertically extending dividers 30. As shown in FIG. 4, when the automobile garment hanger 10 of the present invention is supported from a window 26 of an automobile by sliding the window 26 between the second side leg 18 and the projection 24, the dividers 30 extend in a generally vertical direction such that garment hangers 32 (shown in phantom) supported from the automobile garment hanger 10 of the present invention and disposed between adjacent dividers 30 hang in a generally vertical orientation. The projection 24 of the base leg 14 preferably serves as a brace when the automobile garment hanger of the present invention is supported from a window 26 of an automobile.

Figure 4:
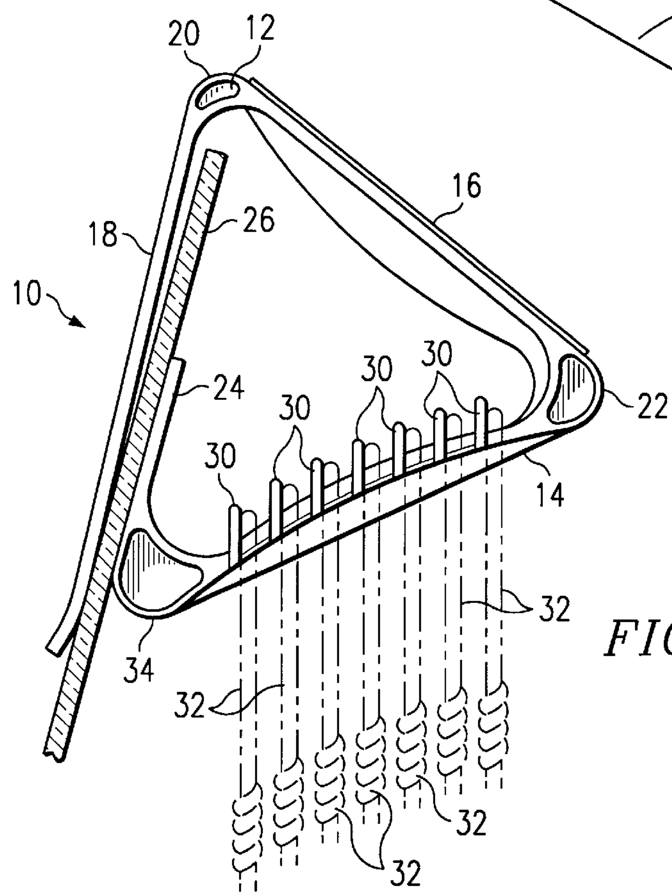
FIG. 4 shows a perspective view of the automobile garment hanger of the present invention supported from a window of an automobile with garment hangers shown in phantom.

Also, as shown in FIG. 4, when the automobile garment hanger 10 of the present invention is supported from a window 26 of an automobile, the dividers 30 extend in a substantially vertical direction from the base leg 14. When the automobile garment hanger 10 of the present invention is oriented in the manner shown in FIG. 4, hangers 32 disposed between adjacent dividers 30 preferably slide toward the divider 30 closest to the first end 34 of the base leg 14 so that the hangers 32 are supported in a neat and orderly fashion. Those of ordinary skill in the art will recognize that the orientation of the base leg 14, dividers 30 and hangers 32 can be modified as desired depending upon the orientation of the window 26 and the angle between the base leg 14 and the projection 24.

While preferred embodiments of the invention have been shown and described, it will be understood by persons skilled in the art that various changes and modifications may be made without departing from the spirit and scope of the invention which is defined by the following claims.

What is claimed is:

1. An automobile garment hanger for mounting in an automobile, comprising:

a generally triangular open loop body comprising a base leg having opposing first and second ends and having a plurality of dividers for supporting one or more garment hangers between adjacent dividers, a first side leg having a first end proximal said second end of said base leg and having a second end, and a second side leg having a first end proximal said second end of said first side leg and having a second end adjacent said first end of said base leg, wherein said second end of said second side leg is separable from said first end of said base leg to provide an opening in said body whereby said body may be slipped over and mounted on a support structure in said automobile.

2. The automobile garment hanger of claim 1 wherein said support structure in said automobile comprises a window.

3. The automobile hanger of claim 1, wherein said support structure in said automobile comprises a handle.

4. The automobile garment hanger of claim 1, wherein said second end of said first side leg is joined to said first end of said second side leg.

5. The automobile garment hanger of claim 1, wherein said second end of said base leg is joined to said first end of said first side leg and said base leg has a projection that is in overlapping engagement with said second end of said second side leg.

6. The automobile garment hanger of claim 5, wherein said second end of said first side leg is joined to said first end of said second side leg.

7. The automobile garment hanger of claim 5, wherein said plurality of dividers extend in a direction generally toward said first end of said base leg and said second end of said first side leg.

8. The automobile garment hanger of claim 7, wherein said dividers enable a plurality of garment hangers to be simultaneously supported from said automobile garment hanger.

* * * * *